G. B. SNOW.
Shield or Fender for Corn Cultivators.
No. 227,134.  Patented May 4, 1880.
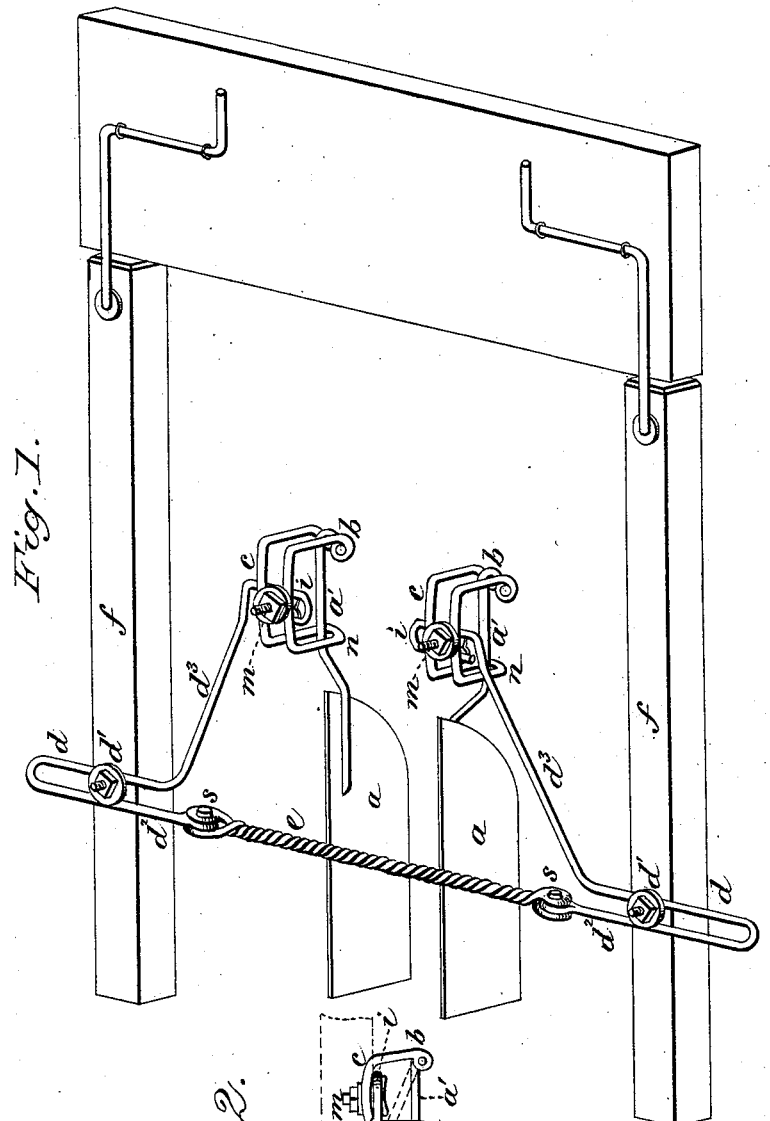

UNITED STATES PATENT OFFICE.

GILBERT B. SNOW, OF SUGAR GROVE, ILLINOIS.

SHIELD OR FENDER FOR CORN-CULTIVATORS.

SPECIFICATION forming part of Letters Patent No. 227,134, dated May 4, 1880.

Application filed February 9, 1880.

*To all whom it may concern:*

Be it known that I, GILBERT B. SNOW, of Sugar Grove, in the county of Kane and State of Illinois, have invented certain new and useful Improvements in Shields or Fenders for Corn-Cultivators; and I do hereby declare the following to be a full, clear, and exact description of the invention, such as will enable others skilled in the art to which it pertains to make and use it, reference being had to the accompanying drawings, which form part of this specification.

My invention relates to improvements in shields or guards in wheeled corn-cultivators for protecting the plants from earth, stones, &c., turned up and thrown to one side by the shovels; and the objects of my improvements are to provide a coupling or connection for the shields with the beams, whereby the latter may be united and adjusted laterally without interfering with the parallel positions of the shields with the corn-rows, and at the same time allow the beams to rise and fall independently of each other, and by which they are maintained in the positions in which they are adjusted, so that the shovel-beams can be set nearer to or farther from each other without interfering with the parallel positions of the shields. I also provide an attaching device of bent couplings of simple construction, and in which a separate stirrup-coupling serves as the pivot of the shield, a stop to limit its descent, the means for holding it from lateral movement, and the means by which the shield is united to the beams in the direction of its length in relation to the shovels.

In the accompanying drawings, Figure 1 represents a view in perspective, showing a portion of the cultivator-frame and the shields or guards connected therewith in positions to bring them within the shovels carried by said beams; and Fig. 2, a detail section of the shield-carrying device.

The shields $a$ $a$ are each pivoted to the front end, $b$, of a separate stirrup-coupling, $c$, formed preferably of a bent rod having raised sides, which are secured to couplings bent so as to form a slotted part, $d$, by which they are secured by bolts and washers $d'$, one crosswise upon the top of each beam. The short sides $d^2$ of said slotted parts are connected by a jointed cross-rod, $e$, which serves to unite the beams $f$, the front ends of which are hinged to the frame, while the long portions $d^3$ are inclined downward from the beams and terminate in loops $i$, which, extending crosswise beneath the raised sides of the separate couplings $c$, are clamped thereto by bolts $m$, nuts, and washers, as shown in Fig. 1.

The arms $a'$ of the shields lie between the raised sides of the separate stirrup-couplings $c$, the rear ends of which are connected at the bottom at $n$, and thus, while the shields are free to rise and fall between the coupling sides to conform to the inequalities of the ground, they are by such sides prevented from lateral movement and limited in their descent by the stops $n$, which form the bottom connections of the rear ends of said stirrup-couplings. The stirrup-couplings can be adjusted upon the loop ends of their carrying-rods $d^3$, so as to bring the shields lengthwise in proper relation to the shovels.

The connecting jointed rod $e$ holds the beams to their adjustment to suit the width of the corn-rows, and the slotted couplings admit of the lateral adjustment of said beams, without changing the parallel positions of the shields, by means of the clamp-bolts, while the pivoted connections $s$ of said rod $e$ with the slotted couplings allow the beams to rise and fall independent of each other. This is effected by having the pivot-connections $s$ arranged to flex with the movements of the beams, while the slotted couplings maintain their fixed connections with the beams. Thus the slotted couplings, in connection with the cross uniting-rod $e$ and the separate stirrup-couplings, serve several functions independent of each other and in co-operation with each other, and make a very simple and durable attachment for the shields to the beams of a corn-cultivator, for the purpose of protecting the corn from clods of earth thrown up to one side by the shovels. The adjustment of the beams toward and from each other also governs the distance of the shovels from the beams.

The lengthwise adjustment of the shields is to adapt them to the side throw of the shovels.

The attachment for the shields is made of bent rods, and, besides serving as such, they form an adjustable connection for the beams.

I claim—

The combination, in a corn-cultivator, of the shields or guards with the separate stirrup-couplings to which they are pivoted, the slotted couplings and their jointed connecting cross-rod, said slotted connected couplings serving to allow of the lateral adjustment of the beams without interfering with the parallel positions of the shields, and of the vertical movements of said beams independent of each other while holding them in united positions for operation.

In testimony that I claim the foregoing I have hereunto set my hand this 8th day of December, 1879.

GILBERT B. SNOW.

Witnesses:
W. N. McLALLEN,
J. J. McLALLEN.